F. OPPENHEIM.
VEHICLE-SEAT.
No. 174,148. Patented Feb. 29, 1876.
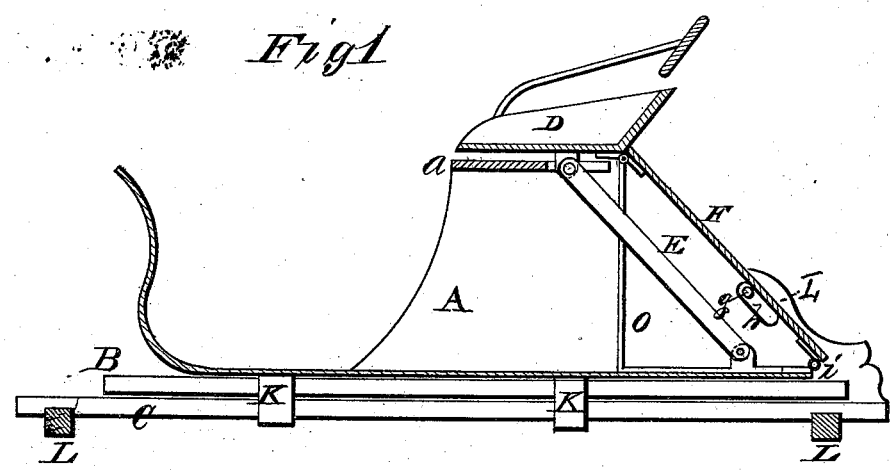
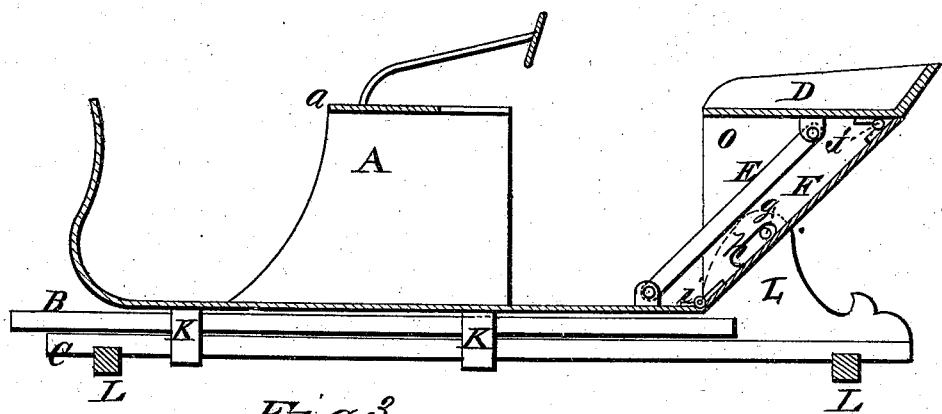
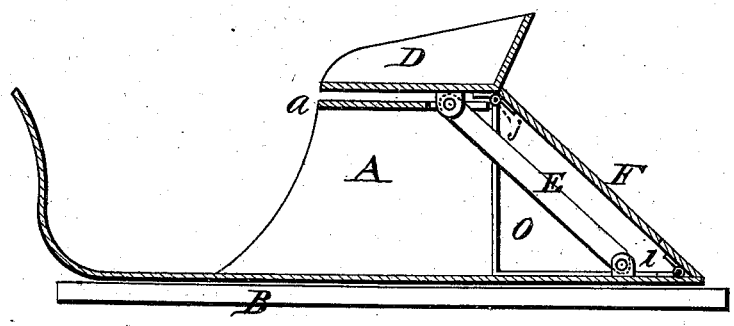

UNITED STATES PATENT OFFICE.

FREDERICK OPPENHEIM, OF SAN FRANCISCO, CALIFORNIA.

IMPROVEMENT IN VEHICLE-SEATS.

Specification forming part of Letters Patent No. 174,148, dated February 29, 1876; application filed January 17, 1876.

*To all whom it may concern:*

Be it known that I, FREDERICK OPPENHEIM, of San Francisco, in the county of San Francisco and in the State of California, have invented certain new and useful Improvements in Wagons and Traveling-Vehicles; and do hereby declare that the following is a full, clear, and exact description thereof, reference being had to the accompanying drawings and to the letters of reference marked thereon, making a part of this specification.

My invention consists of a new and improved application and combination of improved devices for converting single-seated vehicles into double-seated vehicles, and vice versa, at pleasure.

The following is a full description of my invention, and is sufficient to enable any person skilled in the art to which it belongs to construct and use the same, reference being had to the accompanying drawings, which form a part of these specifications.

In the drawings, Figure 1 shows the body of a vehicle containing my invention when arranged with only one seat. Fig. 2 shows the same arranged with two seats. Fig. 3 is the same as Fig. 1, except that it shows a modification only of the invention.

In the drawings, A is a board or panel forming a part of the body of the vehicle, and supports one end of the front seat $a$. B is a sill, to which A is rigidly attached, and to which the lower ends of the rods E and panel F are also attached by hinged or working-joints. D is the back seat. C is a bar, resting upon the spring-bars L L, and carrying upon it the sill B, and upon which the sill B slides when the arrangement of the seats is being changed. K K are iron or other equivalent bands which connect B and C together, but loosely enough to permit B to slide back and forth upon C, when required. F is the panel forming the back of the frame or body of the vehicle, and is connected by a hinged or working-joint with the back part of the seat D, and also by another similar joint with the sill B. E is a rod or brace running parallel with F, and being some distance in front of it, and is also connected by hinged or working joints with the seat D and the sill B. Firmly attached to the lower bar $c$ are perpendicular projections L, near the upper end of which is a pivot, $g$, which projects crosswise with the vehicle, and is long enough to reach through the slot $h$, which is made through the triangular side panel O, which is rigidly attached to the frame or panel F. $i$ is the lower hinge or joint which connects F with B, and $j$ is an upper hinge or joint connecting F with D.

As my invention is confined to the body of vehicles, no running-gears are shown in the drawings.

My invention can be carried upon any of the ordinary known running-gears of traveling-vehicles.

L L show end sectional views of ordinary spring-bars which are in common use for carrying the bodies of vehicles and connecting them with the running-gears.

The drawings are in longitudinal sectional elevation, and show only the inside of one side of the body of the vehicle.

The opposite side (not shown) should be made the same as the side that is shown, having a duplicate of the rod or brace E, hinges $i$ and $j$, and sill B; and when made as in Figs. 1 and 2, having also a duplicate of the pivot $g$, slot $h$, bar C, and bands K K.

The proportions of the different parts are shown practically correct in the drawing, but admit of considerable variation.

The materials used may be such as are commonly used in the manufacture of traveling-carriages.

In the back part of the forward seat $a$ are slots into which the rods E pass when the vehicle is arranged with one seat, as shown in Fig. 1.

In the drawings the lines showing the seat $a$ are shaded something over half of the width of the seat. The parts not shaded represent one edge of the slot into which the rod E passes.

The operation of my invention is as follows: When the vehicle is arranged with a single seat, as in Fig. 1, and it is desired to arrange it with two seats, the change is made by drawing the seat D backward in the arc of a circle, of which E and F will be radii, until it rests upon the triangular side pieces or panels O, which are attached firmly to F and form a part of the body of the vehicle, as shown in the drawings and through which the slots h are made. The ends of the seat D must extend over these triangular panels, and when it goes so far back that it rests upon them, it cannot go any farther, but remains there ready for use.

While the seat is being drawn backward, the pivots g extending through the slots h form fulcrums, and F forms a lever, and as the upper part of F above the pivots is drawn backward when the seat D is drawn back, the lower part of F below the pivots is forced forward, and forces forward with it the sills B, and all that is rigidly attached to them, including the seat a.

The distance which B will be forced forward depends upon the relative height of the pivots g.

To rearrange the vehicle with a single seat, the above operation is reversed by forcing the seat D forward in the arc of the same circle until it rests upon the forward seat a.

The rods or braces E being of the same length as F, and parallel with it, the seat D maintains its horizontal position as it is carried backward and forward.

The side panels are made triangular, so that they join with the side pieces or panels A, and form continuous sides for the body of the vehicle when it is arranged with a single seat, and also serve as a support for the back seat D, when the vehicle is arranged with two seats.

Fig. 3 shows a modified form of my invention without the pivots g, or slots h, or bands K K, or bar C.

Vehicles thus constructed can be arranged with one or two seats at pleasure, but the front seat will not change its position upon the vehicle when the back seat is carried backward or forward.

This form has the advantage of being a little cheaper to construct.

Among the advantages of my invention over other vehicles which have been constructed so as to be converted at will from a single to a double seated vehicle, and vice versa, are, first, by means of the slots in the back part of the front seat I am enabled to make both seats of a full comfortable width; second, by the use of the triangular panel O I get a good support for the back seat, when both seats are used, and do not have the support of the back seat standing out in view as uncomely projections when but one seat is used, as is the case with the supports of the back seats heretofore used in such vehicles; third, by means of the sliding bars and the devices acting in combination with them, the weight of the loaded vehicle is always properly distributed over the running-gears. The seats are also always in a proper position for so distributing the load. The space between the front and back seat is more ample and comfortable, and the panel O, turning back under the back seat, leaves an open and convenient space for getting into the back part of the vehicle when it is arranged with two seats.

Having thus described my invention, what I claim, and desire to secure by Letters Patent, is—

1. The combination, with the sliding sills B, carrying the vehicle bottom and front seat, of the triangular panels O, the hinged rods or braces E, the support or back F, hinged to the vehicle bottom, and the seat D hinged to the support, all substantially as and for the purposes herein set forth.

2. The combination of the stationary bars C, with rear projections L, provided with pins g, the slots h in the triangular panels, the hinged braces E, hinged support F, and seat D, all substantially as and for the purposes herein set forth.

3. The seat A, provided with slots in its rear edge for allowing the passage of the braces E, which connect with the shifting-seat D, as set forth.

In testimony that I claim the foregoing, I have hereunto set my hand this 31st day of December, 1875.

FREDK. OPPENHEIM.

Witnesses:
E. J. SMITH,
M. A. WHEATON.